(12) United States Patent
Tofighbakhsh et al.

(10) Patent No.: US 8,601,499 B2
(45) Date of Patent: Dec. 3, 2013

(54) SYSTEMS, METHODS AND COMPUTER READABLE MEDIA FOR ROUTING REQUESTS FROM AN APPLICATION

(75) Inventors: Mostafa Tofighbakhsh, Cupertino, CA (US); Paul Gausman, Bridgewater, NJ (US); David R. Wolter, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 443 days.

(21) Appl. No.: 12/638,601

(22) Filed: Dec. 15, 2009

(65) Prior Publication Data
US 2011/0145842 A1 Jun. 16, 2011

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................................... 719/328

(58) Field of Classification Search
USPC .......................................................... 719/328
See application file for complete search history.

(56) References Cited

U.S. PATENT DOCUMENTS

| | | | |
|---|---|---|---|
| 6,779,184 B1 * | 8/2004 | Puri et al. | 719/315 |
| 7,523,170 B1 * | 4/2009 | Allen et al. | 709/217 |
| 2001/0019554 A1 * | 9/2001 | Nomura et al. | 370/389 |

* cited by examiner

*Primary Examiner* — Andy Ho
*Assistant Examiner* — Timothy A Mudrick
(74) *Attorney, Agent, or Firm* — Hartman & Citrin LLC

(57) ABSTRACT

Methods, systems, and computer-readable media for distributing requests from an application are provided. According to one aspect, a computer-implemented method for routing requests from an application includes receiving an application programming interface (API) request from an application running on a device. An optimal route for forwarding the API request is determined based on information associated with the API request, and upon determining the optimal route, the API request is forwarded based on the optimal route.

17 Claims, 3 Drawing Sheets

SYSTEMS, METHODS AND COMPUTER READABLE MEDIA FOR ROUTING REQUESTS FROM AN APPLICATION

BACKGROUND

Presently, applications running on devices have to establish a connection with a server before being able to send a request. Typically, establishing a connection, such as opening a socket, utilizes additional middlemen entities within the device, such as an operating system. Because the middlemen entities operate within the device on which the application runs, the device requires specific hardware and/or software components capable of establishing a relationship with servers. By requiring each device to include specific hardware and/or software components for establishing a relationship with servers, the cost of manufacturing such a device increases. Further, devices that already have the required components may be burdened by having to use their resources to establish relationships with servers. On the other hand, however, the network on which the application sends a request to the server is currently primarily used for routing the content since the application establishes a connection with the server before a request is sent over the network. Thus, the network is primarily used for routing the content.

SUMMARY

Embodiments of the disclosure presented herein include methods, systems, and computer-readable media for distributing requests from an application. According to one aspect, a computer-implemented method for routing requests from an application includes receiving an application programming interface (API) request from an application running on a device. An optimal route for forwarding the API request is determined based on information associated with the API request, and upon determining the optimal route, the API request is forwarded based on the optimal route.

According to another aspect, a system for routing requests from an application includes a memory for storing a program containing code for routing requests from an application and a processor functionally coupled to the memory. The processor is responsive to computer-executable instructions contained in the program and configured to receive an API request from an application. An optimal route for forwarding the API request is determined based on information associated with the API request, and upon determining the optimal route, the API request is forwarded based on the optimal route.

According to yet another aspect, a computer-readable medium for routing requests from an application has computer-executable instructions that, when executed by a computer, cause the computer to receive an API request from an application. An optimal route for forwarding the API request is determined based on information associated with the API request, and upon determining the optimal route, the API request is forwarded based on the optimal route.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
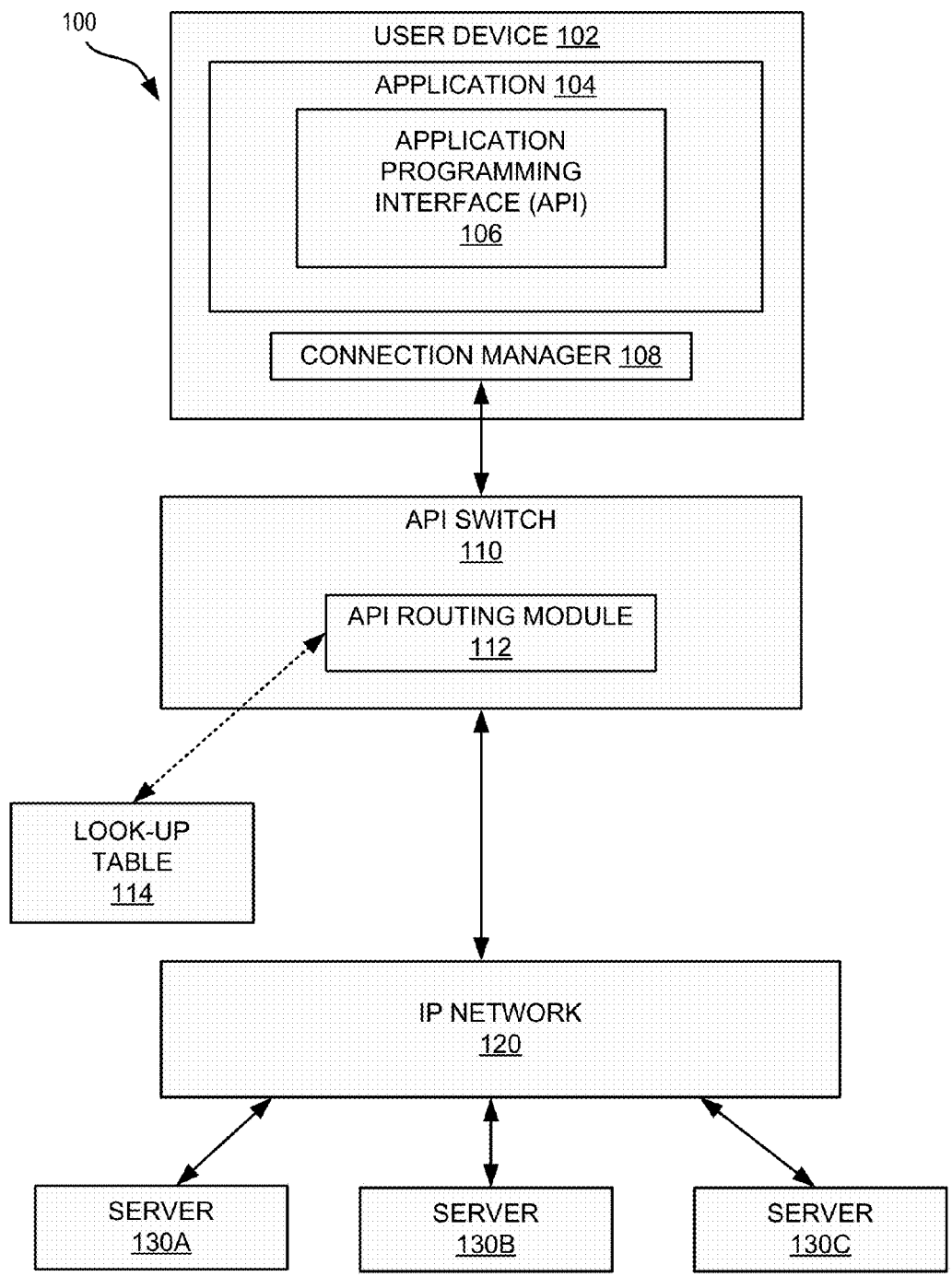
FIG. 1 illustrates a network architecture including an application programming interface (API) switch having an API routing module for routing requests from an application, according to various embodiments.

The following detailed description is directed to methods, systems, and computer-readable media for routing Application Programming Interface (API) requests from an application via a routing module of an API switch that resides on top of a network, such as the Internet Protocol (IP) layer network. Presently, applications establish a session with a particular server prior to any requests being sent over the network. This requires the device on which the application is running to include additional middlemen entities, such as an operating system, that are capable of establishing a session between the application and the server. By requiring a device to include additional middlemen entities, the cost of manufacturing a device increases.

Through the implementation of the present disclosure, a Network API switch includes a routing module that resides on top of the currently existing network at the network edge. The routing module may be utilized to receive requests from an application without the application having to establish a connection to servers or knowing the server address or using additional middlemen entities such as an operating system. Instead, the application running on a device may communicate with the Network API switch, which includes the routing module configured to determine an optimal server and an optimal route on which to route the request to the optimal server. Details regarding the routing module and the API switch will be described herein. According to exemplary embodiments, functions relating to establishing a connection with the server are handled by the Network API switch within the network. Therefore, the network will no longer only be responsible for routing the request, but will also be responsible for determining an optimal server and an optimal route and appropriate servers that an API request from an application should take, as well as establish connections between the Network API switch and the optimal server. In this way, devices will no longer need to establish a client-server session before calling the APIs for establishing connections nor will an application running on the device need to know any details regarding the server to which the request is being sent. As a result, devices may be manufactured with less functionality at lower costs.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, like numerals will represent like elements through the several figures.

FIG. 1 illustrates one embodiment of a network architecture 100, which shows a device 102 in communication with a Network API switch 110 that includes an API routing module 112 that is configured to communicate with a look-up table 114. The Network API switch 110 may reside on top of an IP layer network 120, such as a Multiprotocol Label Switching (MPLS) core network. Servers 130A, 130B, 130C, which are hereinafter referred to generally as server 130, may all be a part of a network, and may be accessible to the application via the IP layer network 120.

According to exemplary embodiments, the device 102 includes an application 104 configured to send an API request to the Network API switch 110 based on protocols defined by an API 106 associated with the application 104. Examples of applications 104 may include a medical condition reporting application stored in a medical device attached to a child. The application may be programmed to periodically report the medical condition of the child. The application may periodically send API requests including the current medical condition of the child to the routing module 112 of the Network API switch 110, which then determines the optimal destination and route on which to send the API requests based on information associated with the API requests. In another example, a user may seek the latest news for a specific region using a mobile device, such as an Iphone. The device may include a news gathering application that generates a series of API requests for the news of specific regions that are sent to the routing module 112 of the Network API switch 110. The routing module may then determine the best destination and route on which to send each API request. In this way, the intelligence of determining which server may be the best source of information resides in the API switch, which is a part of the network, rather than the user device.

In various embodiments, the device 102 may further include a connection manager 108 that may be configured to register the device 102 on the Network API switch 110 and establish one or more connections between the device 102 and the Network API switch 110. It should be understood that the connection manager 108 may be hardware and/or software that may not require an operating system or other system resources to establish a connection with the Network API switch 110. Because the connection manager 108 is configured to establish a connection with the Network API switch 110, the application 104 may no longer have to establish a client/server relationship with the server 130 to which the API request is sent. It should be appreciated that the device 102 may be a wireless device, a laptop device, a medical device, or any hardware and/or software that includes the application 104 and is configured to send an API request from the application to the Network API switch 110. For instance, the device 102 may be a cell phone, a laptop, any other mobile communications device, or a device having a specific functionality such as a blood pressure monitoring and reporting device.

The Network API switch 110 may also be any hardware and/or software component that includes the API routing module 112. The API routing module 112 may be configured to receive the API request from the application 104 associated with the device 102 and determine an optimal server and corresponding optimal route on which the API request should be forwarded to the optimal server 130. As mentioned above, the Network API switch 110 may reside on top of the existing IP layer network 120 at the edge of the network. In this way, by implementing the present disclosure, the functionality associated with the IP layer network 120 may not change. Other network modules, such as a content routing module may continue to operate within the network. In various embodiments, the Network API switch 110 and the API routing module 112 may further be configured to communicate with other functionalities that may already be or later become a part of the existing IP layer network 120.

The API routing module 112 of the Network API switch 110 may also be configured to utilize the look-up table 114 to determine the optimal server and/or the corresponding optimal route on which the API request should be forwarded. The look-up table 114 may be a database that is stored within the Network API switch 110 or is stored in a memory external to the Network API switch 110. The look-up table 114 may include one or more tables that may be continuously updated based on the latest conditions of the network. As will be described in regard to FIG. 2, the API routing module 112 may utilize the look-up table 114 to determine the optimal server and/or the corresponding optimal route on which the API request should be forwarded by using an algorithm that may prioritize potential optimal routes based on a variety of parameters, such as the load at particular servers within the network, the route times of recently received API requests from applications, the type of application or device sending the API request, amongst others.

The API request issued from the application 104 may include a handle that describes where the request came from, such as an application ID or a device ID. Additionally, the API request may also include header information to communicate the requirements of the API definitions associated with the application 104 such that the response to the API request may be sent back to the application 104 of the device 102 in an acceptable format.

Figure 2:
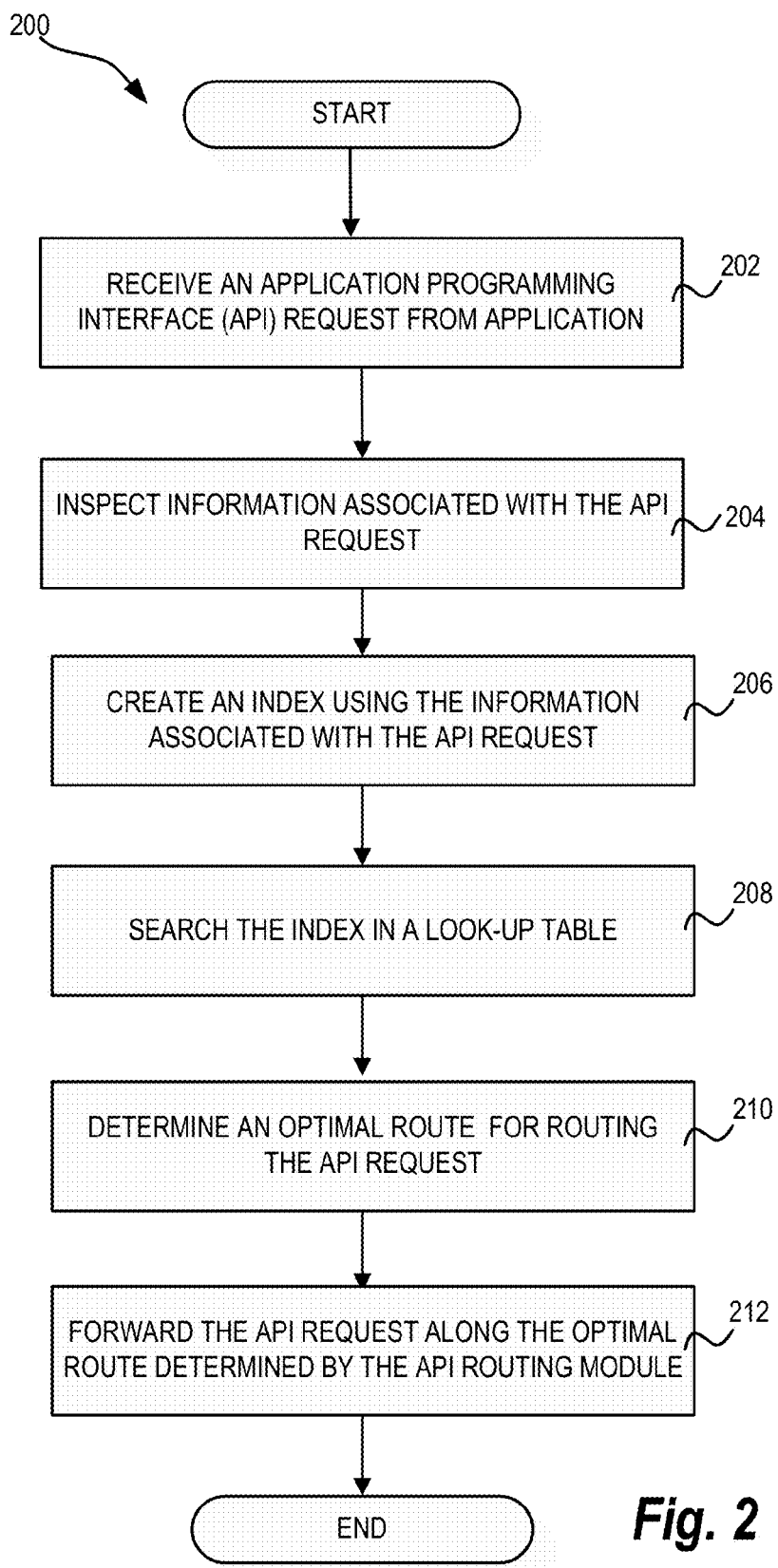
FIG. 2 is a logical flow diagram illustrating aspects of a process for routing requests from the application, according to various embodiments.

Turning now to FIG. 2, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

FIG. 2 shows a logical flow diagram illustrating aspects of a process for routing requests from an application, such as the news gathering application for gathering the latest news for specific regions as described above in regard to FIG. 1. The routine 200 begins at operation 202, where the Network API switch 110 receives an API request from the news gathering application 104 running on the device 102. The API request may be a request for gathering the latest news for a single region, such as Atlanta, GA. As described above, the device 102, such as the Iphone may include the connection manager 108 that establishes a connection with the Network API switch 110. Once the API request is received by the Network API switch 110, the routine 200 proceeds to operation 204, where the API routing module 112 associated with the Network API switch 110 inspects the information associated with the API request. This information may be found in headers associated with the API request. In exemplary embodiments, the information may include various types of information including handles, such as an application ID indicating the application 104 from which the API request was made, a device ID indicating the device 102 from which the API request was sent, a current location of the device 102 and other useful information. In addition, the information may also include keys that may be used to create an index for searching the look-up table 114. Such keys when specified by the application APIs 106 may be used as an indicator that the application 104 is specifically requesting for the API request to be routed to a specified server group, thereby eliminating the need to perform additional lookup for determining the optimal server by the API routing module. For example, the news application may always provide the AT&T server name of choice for the news information instead of "no preference" in the normal case.

From operation 204, the routine 200 proceeds to operation 206, where the API routing module 112 utilizes information associated with the API request to create an index. The index may be a pointer for the server selection of choice and may be created using keys within the API request. Once the index is created, the routine 200 continues to operation 208, where the API routing module 112 may search the look-up table 114 stored in a memory to determine the optimal route on which the API request should be forwarded. The look-up table 114 may be dynamically updated and therefore, the results from the search may be based on up-to-date information.

From operation 208, the routine 200 proceeds to operation 210, where the optimal route on which the API request should be forwarded is determined by the API routing module 112. According to exemplary embodiments, the API routing module 112 utilizes a look-up algorithm that may include searching local cache files, previously requested information and other data that may be stored in the look-up table 114 to determine the optimal route on which the API request should be forwarded. The optimal route may be determined based on a variety of factors, such as speed, quality of service, accuracy, reliability, and the load on the network/server. Further, the API routing module 112 may determine the optimal server from where to gather the information. For instance, one of the parameters that the API routing module 112 may consider is the proximity of the server relative to the device 102 so as to reduce the amount of delay in routing the API request and response. Another parameter that may be considered by the API routing module is whether the server includes the latest news for Atlanta, Ga. In addition, other parameters that may be considered by the API routing module 112 include network traffic and the load at the server to see whether the server has the resource capacity to respond to the API request in a timely fashion.

From operation 210, the routine 200 proceeds to operation 212, where the API request is forwarded by the API routing module 112 based on the optimal route determined by the API routing module 112. In various embodiments, the API request is routed through a content router before being routed to a particular server 130 through the IP layer network 120. The content router inside the network may be used to select the optimal server and corresponding optimal route based on network polices such as time of day, location and security settings. The content router may further select the base rates for the specific stream based on the network criteria. Upon passing the API request through the content router, the API request passes through the IP layer network 120, from where it is routed to the selected server 130. It should be appreciated that the operations of the content router and the IP layer network 120 may not change despite the Network API switch 110 associated with the API routing module 112 residing on top of the IP layer network 120. From operation 210, the routine 200 ends.

In various embodiments, the server 130 to which the API request is sent may provide a response. The API routing module 112 may be configured to further determine a return route for a response to the API request from the server 130 back to the application 104 running on the device 102. In various embodiments, the API routing module 112 may utilize the look-up table to determine the optimal return route. In situations where a response may be provided, the API routing module 112 may additionally notify the server 130 of the optimal return route for a response to the API request. For instance, the API routing module 112 may insert additional header information into a header of the API request that includes the optimal return route for a response sent from the server 130 to the application 104.

In further embodiments of the present disclosure, API requests sent from the device to the servers may go through a deep packet inspection process via a deep packet inspection module. In various embodiments, the API request may go through multiple deep packet inspection modules as it is routed through the network. Upon passing through a deep packet inspection, the API request may be intercepted and redirected to a different server or the same server via a different route. According to embodiments, the server to and/or the route on which the API request is redirected may be determined by the API routing module 112 or another module within the IP layer network 120. Furthermore, the deep packet inspection may be performed at the edge of the network via a deep packet inspection module that sits on top of the IP layer network 120.

Figure 3:
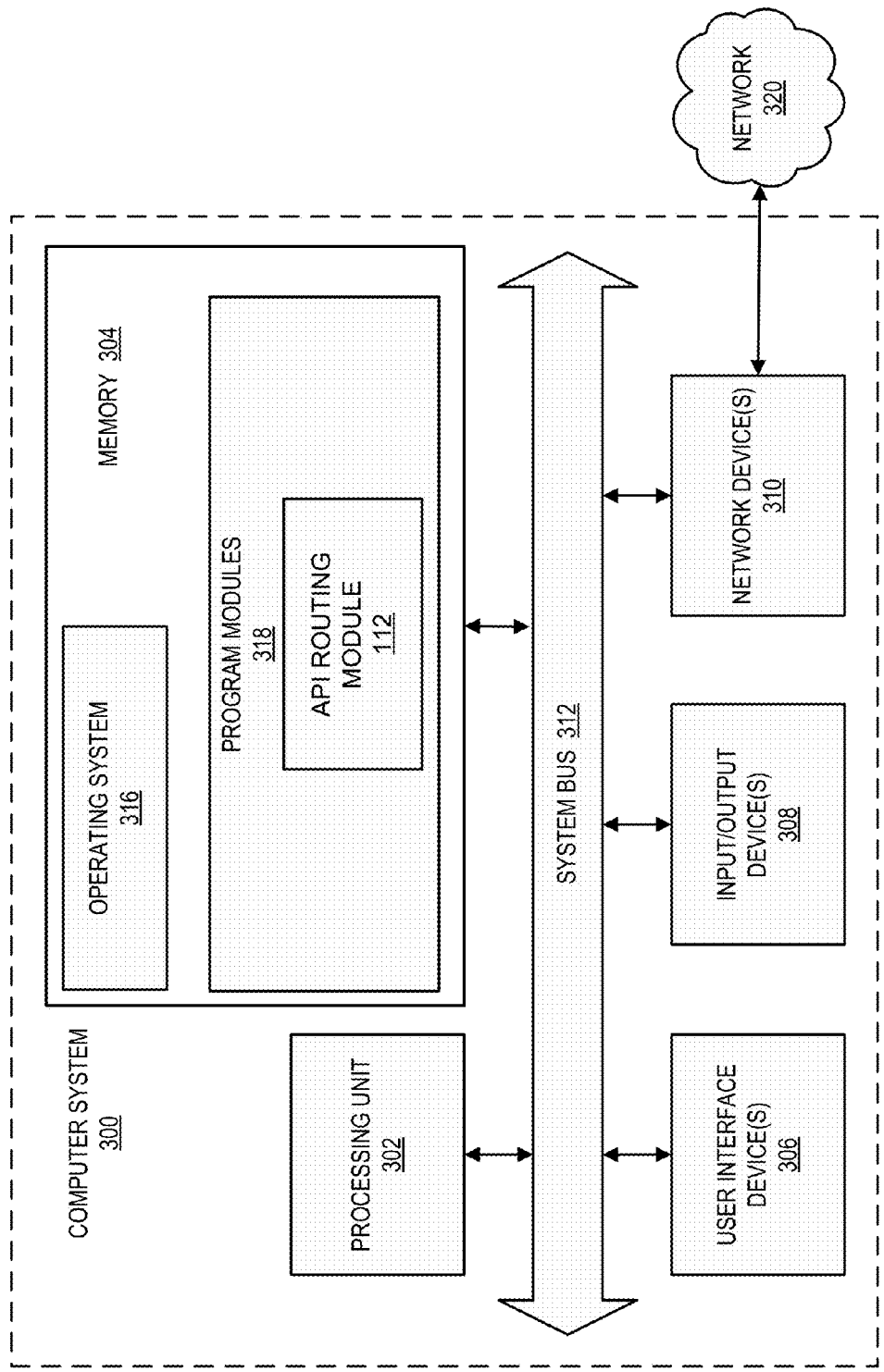
FIG. 3 is a block diagram illustrating an exemplary computer system configured to route requests from an application, in accordance with various embodiments.

FIG. 3 is a block diagram illustrating a computer system 300 configured to route API requests from an application, in accordance with embodiments. Examples of the computer system 300 may include the device 102 executing the application 104 and the Network API switch 110. The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 304 communicates with the processing unit 302 via the system bus 312. In one embodiment, the memory 304 is operatively connected to a memory controller (not shown) that enables communication with the processing unit 302 via the system bus 312. The memory 304 includes an operating system 316 and one or more program modules 318, according to exemplary embodiments. Examples of operating systems, such as the operating system 316, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. Examples of the program modules 318 include the API routing module 112, the connection manager 108 and the API 106. In some embodiments, the program modules 318 are embodied in computer-readable media containing instructions that, when executed by the processing unit 302, performs embodiments of the routine 200 for routing API requests from an application, as described in greater detail above with respect to FIG. 2. According to embodiments, the program modules 318 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 318. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 300 to communicate with other networks or remote systems via a network. Examples of the network devices 310 may include, but are not limited to, a modem, a radio frequency ("RF") or infrared ("IR") transceiver, a telephonic interface, a bridge, a router, or a network card. The network 320 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 320 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Through the implementation of embodiments described herein, an application running on a device may send a request to an API switch that resides on top of the existing network without having to establish a connection with a particular server. In this way, applications may require fewer processing resources lowering the costs of devices. Further, because the API routing module of the API switch collectively handles the requests from many applications, the API routing module may utilize a much larger database of information to determine the optimal route on which the request from the application should be sent. In this way, the API routing module of the API switch may reduce the applications' estimated time of execution (ETE), provide more accurate responses to requests, improve the performance of applications and significantly reduce bottlenecks and its associated delays.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for routing requests from an application executing on a device, comprising:
    registering, by an application programming interface switch comprising a processor, the device, the application programming interface switch arranged on top of an Internet Protocol network and communicatively coupled to a plurality of server computers via the Internet Protocol network;
    receiving, at the application programming interface switch, an application programming interface request from the application;
    determining, by the application programming interface switch, an optimal server computer of the plurality of server computers and an optimal route for forwarding the application programming interface request from the application programming interface switch to the optimal server computer via the Internet Protocol network, wherein determining the optimal server computer of the plurality of server computers and the optimal route is based on loads associated with the plurality of servers, route times associated with application programming interface requests received from applications, and a type of the application from which the application programming interface request is received;
    determining, by the application programming interface switch, an optimal return route to be used by the optimal server computer to route a response to the application programming interface request from the optimal server computer to the application executing on the device;
    inserting, by the application programming interface switch, additional header information into a header of the application programming interface request, the additional header information comprising the optimal return route for the optimal server to use to route the response to the application programming interface request to the application executing on the device;
    after determining the optimal server computer, the optimal route, and the optimal return route, forwarding the application programming interface request from the application programming interface switch to the optimal server computer based on the optimal route; and
    in response to the application programming interface request being redirected after being forwarded from the application programming interface switch and passing through a deep packet inspection, determining, by the application programming interface switch, a server to which the application programming interface request is redirected.

2. The method of claim 1, further comprises:
creating an index from information contained within the application programming interface request; and
searching a look-up table using the index for determining the optimal server computer and the optimal route.

3. The method of claim 2, wherein creating an index from information contained within the application programming interface request comprises:
inspecting header information of the application programming interface request;
selecting keys contained within the application programming interface request; and
creating the index based on the header information and the keys.

4. The method of claim 3, wherein selecting keys contained within the application programming interface request comprises selecting at least one of a first key specifying an application identifier of the application, a second key specifying a device identifier of the device, and a third key specifying a location of the device.

5. The method of claim 1, wherein forwarding the application programming interface request from the application programming interface switch to the optimal server computer based on the optimal route comprises sending the application programming interface request to the optimal server computer associated with the optimal route via the Internet Protocol network.

6. The method of claim 1, wherein registering the device comprises establishing a connection between the device and the application programming interface switch prior to receiving, at the application programming interface switch, the application programming interface request from the application.

7. An application programming interface switch for routing requests from an application executing on a device, the application programming interface switch comprising:
a processor; and
a memory storing instructions that, when executed by the processor, cause the processor to perform operations comprising:
registering the device, wherein the application programming interface switch is arranged on top of an Internet Protocol network and communicatively coupled to a plurality of server computers via the Internet Protocol network,
receiving an application programming interface request from an application executing on a device,
determining an optimal server computer of the plurality of server computers and an optimal route for forwarding the application programming interface request to the optimal server computer via the Internet Protocol network, wherein determining the optimal server computer of the plurality of server computers and the optimal route is based on loads associated with the plurality of servers, route times associated with application programming interface requests received from applications, and a type of the application from which the application programming interface request is received,
determining an optimal return route to be used by the optimal server computer to route a response to the application programming interface request from the optimal server computer to the application executing on the device,
inserting additional header information into a header of the application programming interface request, the additional header information comprising the optimal return route for the optimal server to use to route the response to the application programming interface request to the application executing on the device,
after determining the optimal server computer, the optimal route, and the optimal return route, forwarding the application programming interface request to the optimal server computer based on the optimal route, and
in response to the application programming interface request being redirected after being forwarded from the application programming interface switch and passing through a deep packet inspection, determining a server to which the application programming interface request is redirected.

8. The system of claim 7, wherein the operations further comprise:
creating an index from information contained within the application programming interface request; and
searching a look-up table using the index for determining the optimal server computer and the optimal route.

9. The system of claim 7, wherein creating an index from information associated with the application programming interface request comprises:
inspecting header information of the application programming interface request;
selecting keys contained within the application programming interface request; and
creating the index based on the header information and the keys.

10. The system of claim 9, wherein selecting keys contained within the application programming interface request comprises selecting at least one of a first key specifying an application identifier of the application, a second key specifying a device identifier of the device, and a third key specifying a location of the device.

11. The system of claim 7, wherein forwarding the application programming interface request based on the optimal route comprises sending the application programming interface request to the optimal server computer associated with the optimal route via P the Internet Protocol network.

12. The system of claim 7, wherein registering the device comprises establishing a connection between the device and the application programming interface switch prior to receiving the application programming interface request from the application.

13. A computer-readable storage medium for routing requests from an application executing on a device, the computer-readable storage medium having computer-executable instructions stored thereon that, when executed by a processor of an application programming interface switch, cause the application programming interface switch to perform operations comprising:
registering the device, wherein the application programming interface is arranged on top of an Internet Protocol network and communicatively coupled to a plurality of server computers via the Internet Protocol network;
receiving an application programming interface request from the application;
determining an optimal server computer of the plurality of server computers and an optimal route for forwarding the application programming interface request from the application programming interface switch to the optimal server computer via the Internet Protocol network, wherein determining the optimal server computer of the plurality of server computers and the optimal route is based on loads associated with the plurality of servers, route times associated with application programming interface requests received from applications, and a type of the application from which the application programming interface request is received;

determining an optimal return route to be used by the optimal server computer to route a response to the application programming interface request from the optimal server computer to the application executing on the device;

inserting additional header information into a header of the application programming interface request, the additional header information comprising the optimal return route for the optimal server to use to route the response to the application programming interface request to the application executing on the device;

after determining the optimal server computer, the optimal route, and the optimal return route, forwarding the application programming interface request to the optimal server computer based on the optimal route; and in response to the application programming interface request being redirected after being forwarded from the application programming interface switch and passing through a deep packet inspection, determining a server to which the application programming interface request is redirected.

14. The computer-readable storage medium of claim 13, wherein the operations further comprise:
   creating an index from information contained within the application programming interface request; and
   searching a look-up table using the index for determining the optimal server computer and the optimal route.

15. The computer-readable storage medium of claim 13, wherein creating an index from information contained within the application programming interface request comprises:
   inspecting header information of the application programming interface request;
   selecting keys contained within the application programming interface request; and
   creating the index based on the header information and the keys.

16. The computer-readable storage medium of claim 13, wherein forwarding the application programming interface request to the optimal server computer based on the optimal route comprises sending the application programming interface request to the optimal server computer associated with the optimal route via the Internet Protocol network.

17. The computer-readable storage medium of claim 13, wherein registering the device comprises establishing a connection between the device and the application programming interface switch prior to receiving the application programming interface request from the application.

* * * * *